(12) United States Patent
Jones

(10) Patent No.: US 8,851,213 B1
(45) Date of Patent: Oct. 7, 2014

(54) POWERED WHEEL CHAIR WITH AUTOMATIC EMERGENCY STOPPING

(76) Inventor: Bryan Bradley Jones, Austin, TX (US)

( * ) Notice: Subject to any disclaimer, the term of this patent is extended or adjusted under 35 U.S.C. 154(b) by 1168 days.

(21) Appl. No.: 12/655,129

(22) Filed: Dec. 24, 2009

(51) Int. Cl.
*A61G 5/04* (2013.01)
*B60K 28/04* (2006.01)
*B60L 3/00* (2006.01)

(52) U.S. Cl.
USPC ........ 180/65.1; 180/272; 180/273; 280/304.1

(58) Field of Classification Search
USPC ......................... 180/65.1, 907, 271, 272, 273; 280/250.1, 304.1
See application file for complete search history.

(56) References Cited

U.S. PATENT DOCUMENTS

| | | | |
|---|---|---|---|
| 5,341,894 A * | 8/1994 | Van Gorder et al. | 180/271 |
| 5,706,909 A * | 1/1998 | Bevins et al. | 180/273 |
| 5,799,756 A * | 9/1998 | Roberts et al. | 188/2 F |
| 6,092,824 A * | 7/2000 | Ritchie et al. | 280/304.1 |
| 6,154,690 A * | 11/2000 | Coleman | 701/1 |
| 6,315,058 B1 * | 11/2001 | Birkenbach et al. | 172/762 |
| 6,354,390 B1 * | 3/2002 | Uchiyama et al. | 180/65.1 |
| 6,471,231 B1 * | 10/2002 | Hargroder | 280/304.1 |
| 7,144,025 B2 * | 12/2006 | Wakita et al. | 280/250.1 |
| 7,369,943 B2 * | 5/2008 | Adams | 701/301 |
| 8,203,454 B2 * | 6/2012 | Knight et al. | 340/573.1 |
| 8,522,908 B1 * | 9/2013 | Collins et al. | 180/272 |
| 2002/0070866 A1 * | 6/2002 | Newham | 340/573.1 |

* cited by examiner

*Primary Examiner* — Joseph M Rocca
*Assistant Examiner* — Marc A Scharich
(74) *Attorney, Agent, or Firm* — Charles E. Graves

(57) ABSTRACT

A motorized wheel chair is equipped with a safety system for bringing the wheel chair to a stop if a wheel chair user should experience an emergency situation which renders the user unable to safely control the wheel chair while in use. The safety system utilizes at least one switch mounted to an upright backrest for sensing whether or not the user's back is in contact with the backrest. If the user's back is in contact with the backrest, the wheel chair is operative and may be controlled in a normal manner. If the user's back moves out of contact with the backrest, whether voluntarily or because of an emergency situation, the safety system operates to disable operation of motors which operably propel drive wheels of the wheel chair, thus causing the wheel chair to be inoperative and bringing the wheel chair to a stop if in motion.

10 Claims, 7 Drawing Sheets

POWERED WHEEL CHAIR WITH AUTOMATIC EMERGENCY STOPPING

TECHNICAL FIELD

This invention relates to powered wheel chair devices and in particular to motorized wheel chair braking mechanisms that automatically respond to abnormal circumstances occurring during usage which may signal that the chair-bound user has lost ability to control.

BACKGROUND OF THE INVENTION

Brakes are standard features on powered wheel chairs to provide the user a positive control for bringing the chair to a stop from its travel mode. Some wheel chair braking systems are provided by de-energizing the motor, which by itself brings the wheel chair to rest. Other breaking systems place friction on the chair wheels if the joystick is put in neutral. These systems serve convalescents or those who have lost arm and leg locomotion and are not able to apply manual braking force directly to the rotating wheel hub.

An example of manual breaking is described in U.S. Pat. No. 6,315,085. A semi-automatic brake applicator comprises linkages that translate pivotal motion of an actuator lever to cause an actuator rod to move linearly, driving a clamp to cause a brake shoe to engage. Another system is disclosed in U.S. Pat. No. 5,799,756 in which the brake actuation is provided by a rotatable disc connected concentrically to the hub. Linkages attaching the rotatable disc to the brakes engage the brakes in one rotation position and disengage the brakes in another.

The two known exemplary braking mechanisms described are actuated by deliberate application of some force or motion on the user's part. An example is mechanical means responsive to the user getting out of the chair. This exiting movement causes brakes to be applied. In the embodiment shown, the weight of the user on the wheel chair seat places a brake mechanism in release mode allowing the chair to move. When the user raises out of the chair, thus removing weight from the chair seat, the brake is caused to engage, stabilizing the wheel chair for safer entry and egress.

Another example is a motorized wheel chair in which three separate safety braking mechanisms actuate upon the occurrence of a particular event. One safety mechanism is sensitive to changes of floor slope or surface elevation to stop the motor, which then acts as a brake. A second switch is sensitive to impact of the moving wheel chair with another object, to cut power. A third switch may be activated remotely to stop the wheel chair.

One condition which these and other prior art wheel chair safety-braking mechanisms do not adequately address, is the case of a user who for some reason has lost the capacity to control the wheel chair while in the midst of travel. Such circumstances are not uncommon with users who are subject to periods of light-headedness owing to medications; or persons subject to seizures; or persons who have lost some use of their arms or limbs and cannot readily react to conditions where braking is needed.

SUMMARY OF THE INVENTION

The invention is based on the observation that when an occupant of a motorized wheel chair in motion lapses into unconsciousness, the occupant will slump forward while remaining seated. The user's legs stay in their normal position; but the pressure exerted by the person's back on the upright portion of the wheelchair backrest will be diminished or removed altogether. Whereas the occupant's back is normally in continuous contact with the wheelchair backrest, the occupant's feinting or seizure or other momentary weakened state (hereinafter, "event") will virtually always result in the torso and back muscles relaxing. In this state of relaxation the user will involuntarily lean or slump forward.

Building on this observation, the invention in one embodiment is a single contact pressure-sensitive on-off switch appropriately located within or upon the fabric of the frontside of the upright chair backrest. The safety switch, normally "off", actuates to "on' in response to pressure from the user's back being in contact with the back rest. In its "on" mode the switch closes a leg of a circuit from the wheel chair battery to the motor. The switch goes to its off-mode if the user moves enough forward, or involuntarily slumps forward due to the onset of an event. In this mode the switch opens the powering circuit of the wheel chair motor. The motor stops and the chair slows to a halt. Removal of the occupant's weight causing the pressure-sensitive switch to open, also actuates the wheel chair's available braking system.

Users differ in weight, height, and body shape, however. A switch with a single pair of contacts thus could register false opens as the user adjusts position in the chair for comfort or leans forward to attend to something. For the system to optimize detecting of a real event and avoid reacting to false information, more than one switch contact pair is employed; and preferably a plurality of spatially separated switch contact pairs are employed.

A type of safety switch that will actuate to detect forward movement of a user's back away from a wheel chair backrest while registering fewer false signals, is the ribbon-type switch which has several contact pairs along its length. The elongate ribbon switch contacts are normally open contacts. Application of pressure at any point along the active switching zone of a ribbon switch, closes the circuit routed through the ribbon switch. Importantly, the ribbon switch does not altogether open until all of the contact points along its length are open. It will be seen in the illustrations below that using a ribbon-type switch, and more preferably a multidirectional array of ribbon-type switches, provides a powered wheel chair with braking mechanisms that automatically respond to an actual event while discriminating against many routine circumstances which are not events.

Advantageously, a delay device is used with the ribbon switch to allow the user a brief time span to adjust his/her position in the chair without causing the pressure switch to detect an actual event and actuate the chair-stopping mechanisms. Additionally, a warning signal connected to the safety switch and visible to the chair user, goes off immediately on opening of the ribbon contacts. The warning signal also is transmitted by wireless radio to an attendant's station for investigation. The warning signal may audible with a unique sound, akin to the sound of a construction vehicle backing up. Another warning signal is a flashing light affixed to the wheel chair.

DETAILED DESCRIPTION OF AN ILLUSTRATIVE EMBODIMENT

Figure 1:
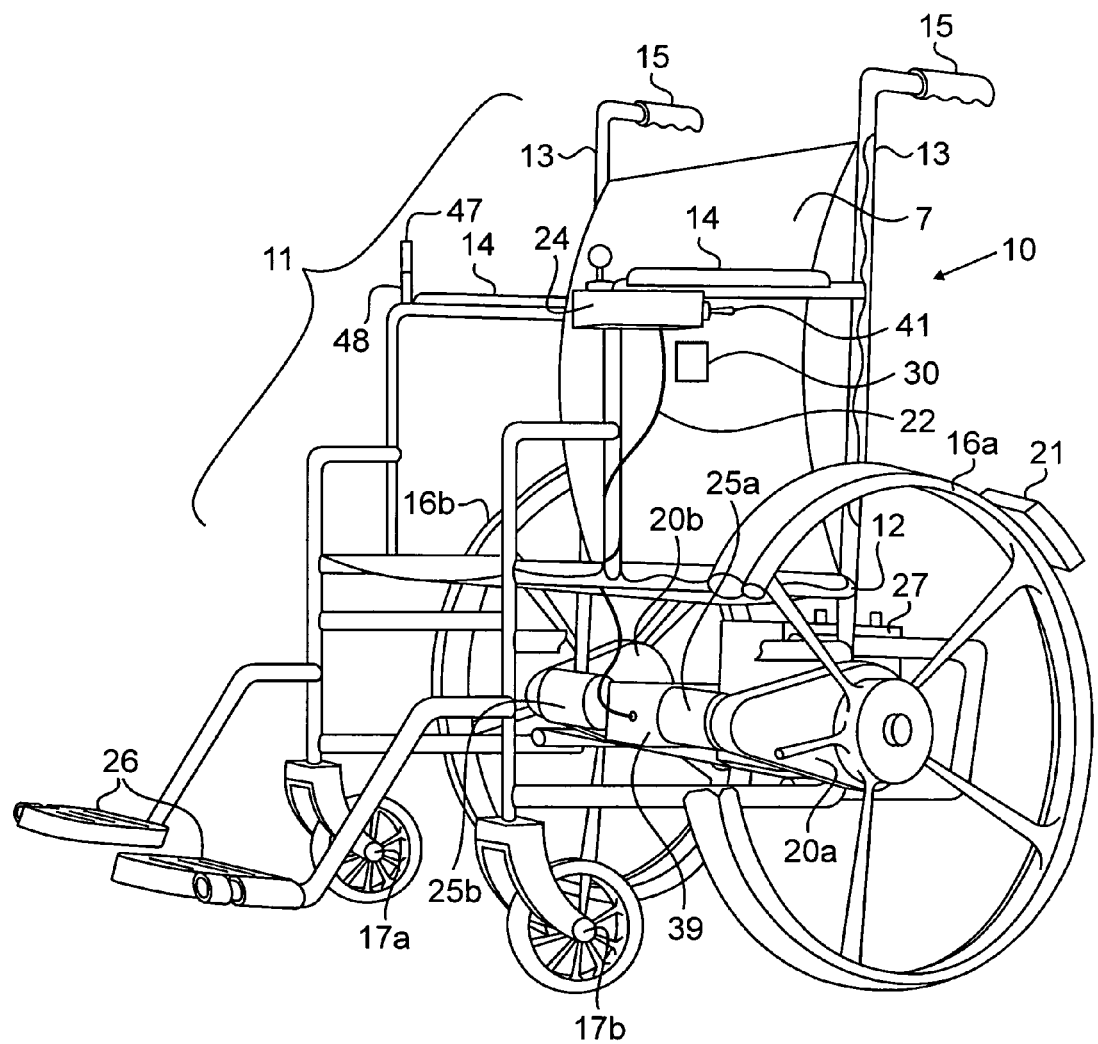
FIG. 1 is an isometric view of a motorized wheel chair showing details including seat and backrest with safety switch.

Referring to FIG. 1, a wheel chair 10 consists of a metal frame 11 which can be of tubular or angle iron construction, and includes a horizontal seat support 12, a backrest support 13 arm rests 14 and chair handles 15. A joystick 24 mounted on frame 11 near one of the arm rests 14 connects to controls for the electric motors 20a, 20b to be described later. The motors 20a, 20b drive main chair wheels 16a, 16b through friction drive rollers 25a, 25b. Conventional brakes including brake shoe 21 under control of the user by various means (not shown) are provided. Motors 20a, 20b also can supply braking for wheel chair 10. Frame 11 includes conventional footrests 26, front castor wheels 17a, 17b, and a battery 27. The wheel chair backrest 13 may be formed as a solid section of cloth or leather; or may be a cushion. For the present invention it is preferable to provide the cushion style backrest such as is illustrated by cushion 7 in FIG. 1.

Figure 2:
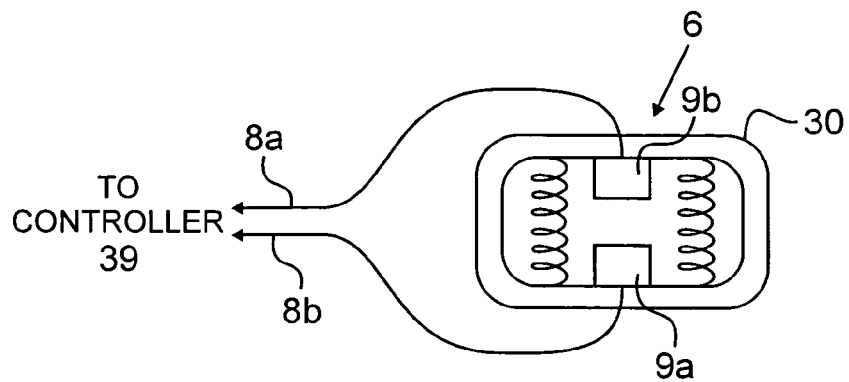
FIG. 2 is a schematic side view of a generic on-off switch.
Figure 3:
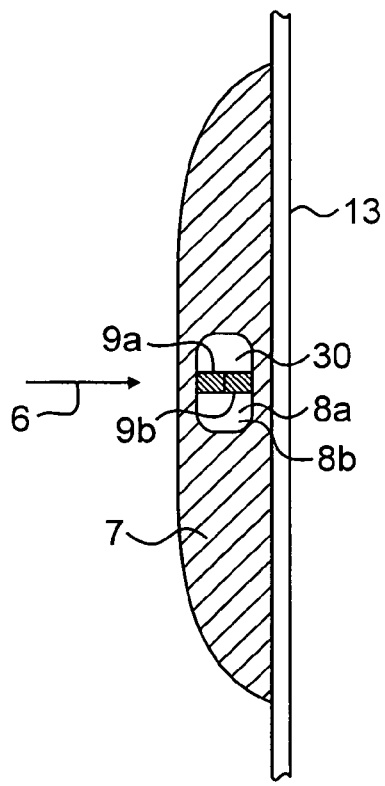
FIG. 3 is a schematic side view of a wheel chair backrest with an embedded on-off ribbon switch.

Cushion 7 mounted on backrest support 13 contains one or more switches, such as the surface-mounted single-contact switch 30 in FIG. 1. Switch 30 alternatively may be located within the cushion 7 as shown in FIG. 3. As illustrated in FIG. 2, single-contact switch 30 is normally "open", but closes with pressure applied in direction of arrow 6 to drive contacts 9a, 9b together, completing a circuit through leads 8a, 8b. When the user is seated and leaning back in normal fashion, with back pressure impinging on cushion 7, switch 30 closes to activate drive and control circuits to be described later with FIG. 10. Switch 30 opens when the chair user varies from his usual position of FIG. 6 and leans or slumps forward as illustrated in FIG. 7.

Figure 4:
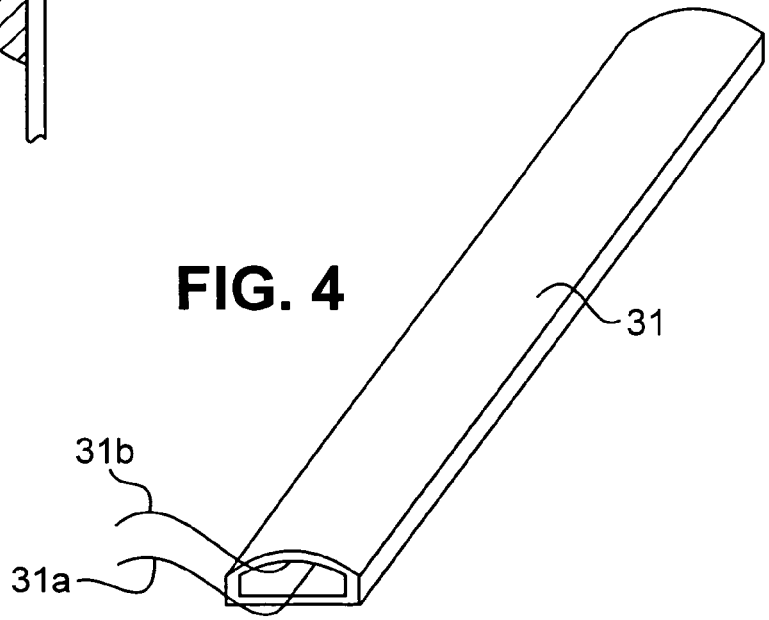
FIG. 4 is a top perspective view of a typical ribbon switch tube housing.
Figure 4A:
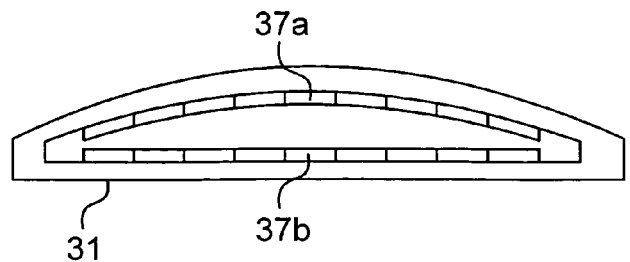
FIG. 4A is a side cross-sectional view of a ribbon switch in "open" mode.
Figure 4B:
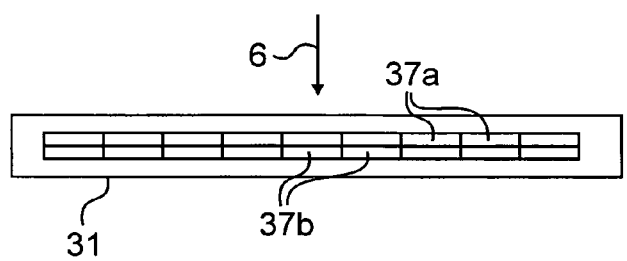
FIG. 4B is a side cross-sectional view of a ribbon switch in "close" mode.
Figure 10:
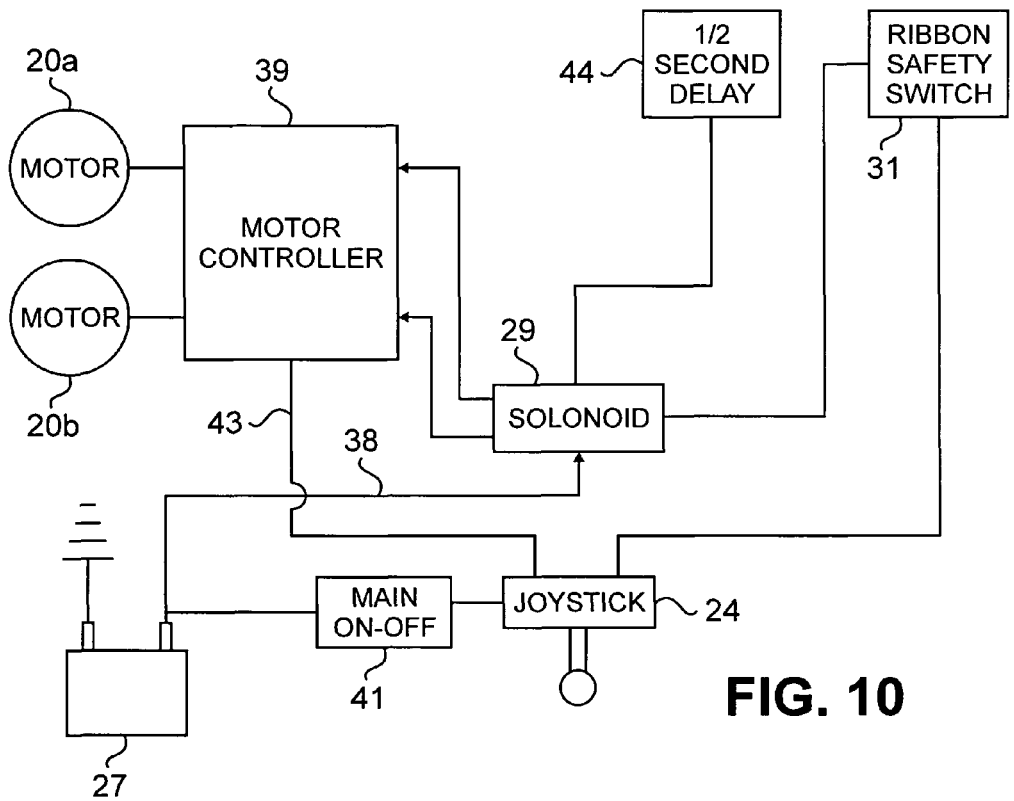
FIG. 10 is a circuit schematic showing power supply and control lines.

A preferred embodiment of the invention comprises a safety switch system consisting of one or more ribbon-type switches illustrated by switch 31 in FIG. 3 which is constructed with normally open contacts. When all of their contacts are in their normally open mode, ribbon switch or switches 31 open the circuit leading from battery 27 to motors 20a, 20b just as the single-contact switch 30 operates. The switch 31 in FIGS. 4, 4a and 4b is one type of ribbon switch suitable for use in the invention, consisting of a molded plastic tube 33 having an elliptic cross-section. Switch 31 has opposing electrical contact strips which can be continuous or can be made up of conducting blocks such as the arrays 37a, 37b. The strips 31 are normally held "open" as in FIG. 4a because of the plastic memory of tube 33. If a force in the direction of arrow 6 is applied, the contacts 37a, 37b meet to complete a circuit as shown in FIG. 4b. Leads 31a, 31b connected to arrays 37a, 37b are electrically connected to control circuits as shown in FIG. 10 described hereinafter.

Figure 6:
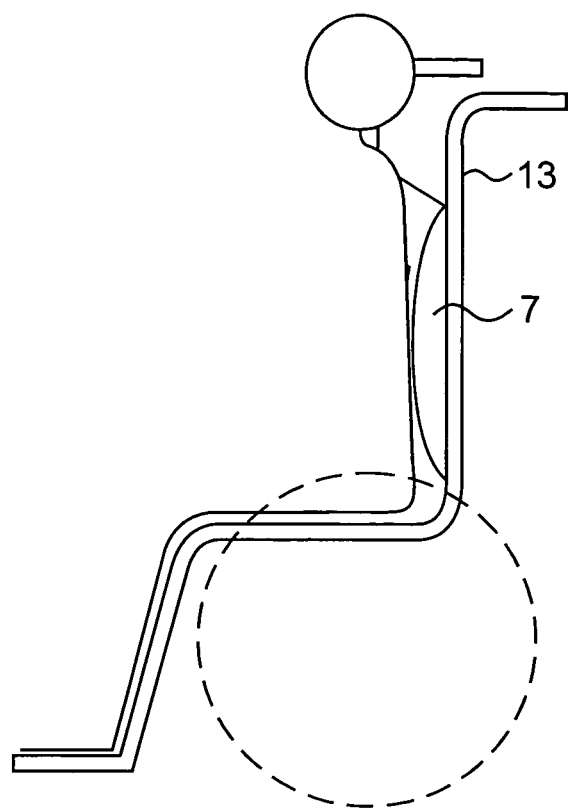
FIGS. 6 and 7 are sketches of wheel chair and user in upright and slumped positions.
Figure 7:
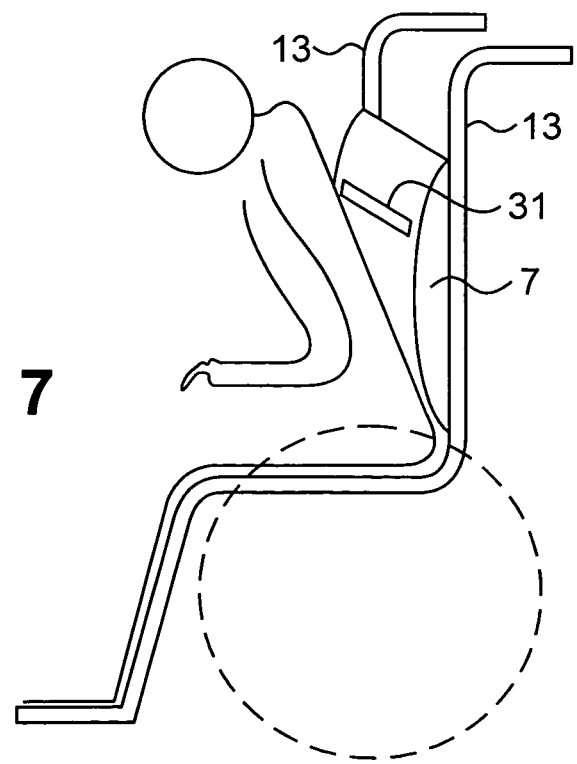

Referring to FIG. 6, in normal use the chair user's back is in constant contact with ribbon switch 31 along most or all of the ribbon's length. If any part of the user's back pressure closes any segment of the opposing switch contacts 37a, 37b, the circuit will remain closed. If the user puts the chair in motion with actuation of joystick 24, the chair will travel. When, however, the chair occupant moves or pitches forward enough to be completely out of back contact with ribbon switch 31, as seen in FIG. 7, the switch reverts to normally-open. This mode stops the wheel chair by cutting power to motors 20a, 20b.

Figure 5:
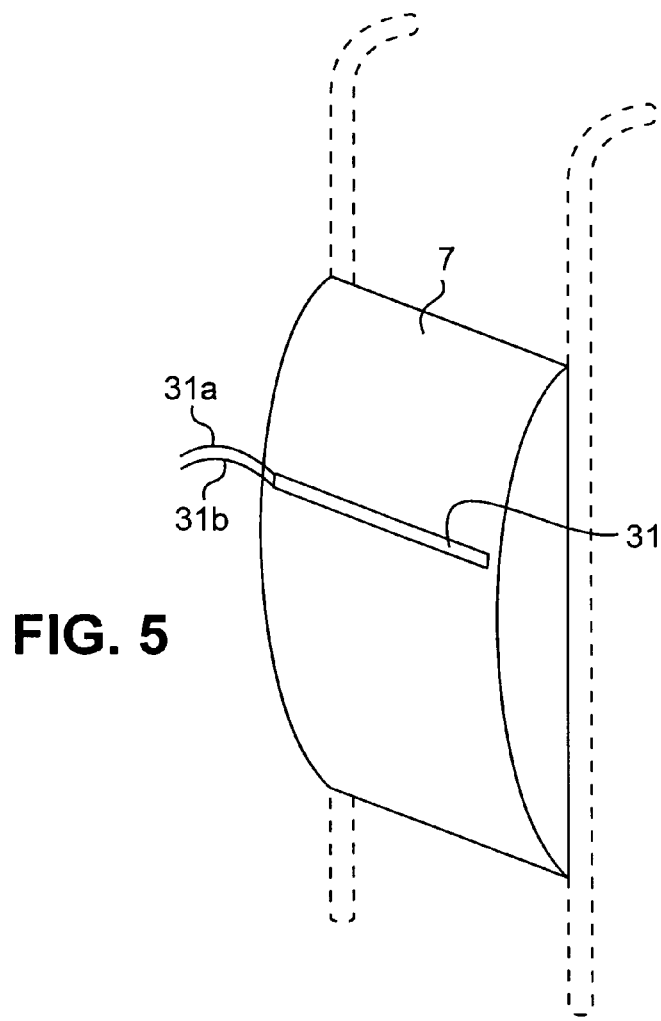
FIG. 5 is a frontal view of a chair front with a surface-mounted ribbon switch.
Figure 8:
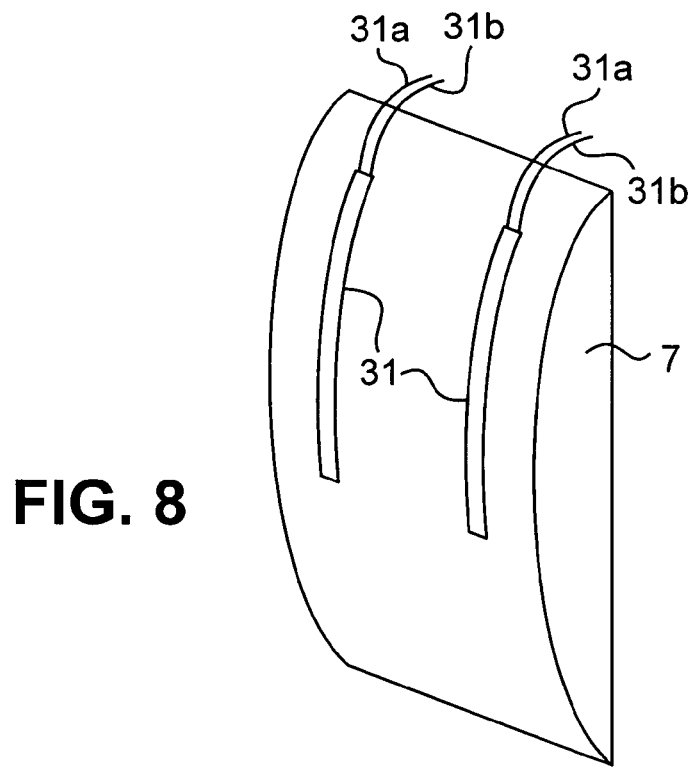
FIG. 8 is a front perspective of a chair back cushion with vertical mounted ribbons.

A single ribbon switch 31 may be surface-mounted horizontally across the mid-portion of the surface of cushion 7 as shown in FIG. 5. An advantage of the ribbon mounting design of FIG. 5 is its simplicity and ease of installation. However, a possible drawback is that the single ribbon horizontal mount may give false readings when a user leans forward or adjusts seat position enough to remove all physical contact with the single ribbon switch 31. One ribbon configuration that is less susceptible to false readings is shown in FIG. 8, and consists of two elongate ribbon switches both denoted 31, which are vertically mounted inboard of the vertical edges of chair cushion 7. This mounting design provides more pressure sensitive surface to be in contact with the user's back in normal use. More ribbon surface equates to less likelihood of the user, in normal squirming or adjusting of seating position in the chair, to come out of contact completely with all ribbon surface. The mounting design of FIG. 8 also is more accommodating to a thin or small user who is prone to turning left or right while the chair is in motion. This is because a turn one way (to the right for example) may bring a light weight user completely out of contact with the left-ribbon 31 but the user will still be in contact with at least some of the right-ribbon 31. Removal of contact with both ribbon switches 31 of FIG. 8 will interrupt power to motors 20a, 20b, causing braking; but even one point of contact occurring on contacts 37a, 37b within ribbon switch 31 shown in FIG. 4B will be enough to avoid a false "open".

Figure 9:
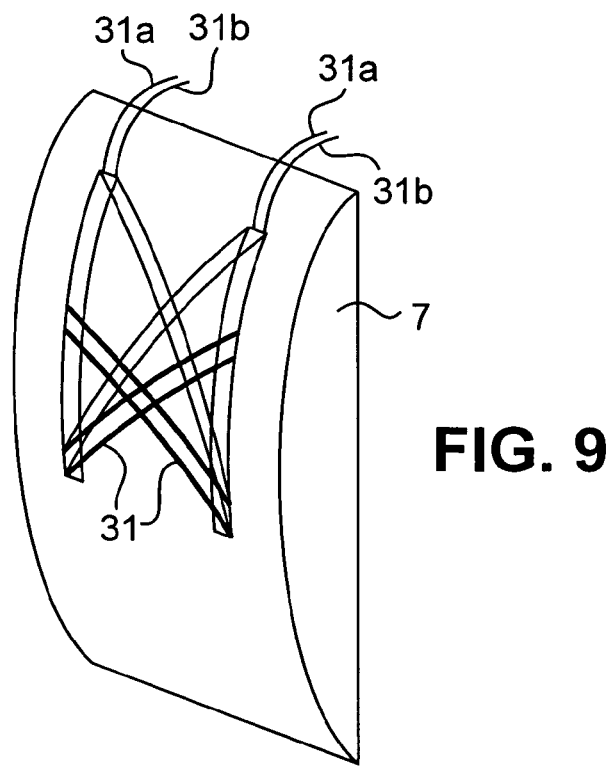
FIG. 9 is a front perspective of a chair back cushion with various mounted ribbons.

The ribbon mounting configuration shown in FIG. 9 uses multiple crisscrossing ribbon switches 31. An advantage of this type configuration is that it presents a number of ribbon switches 31 to most of the area of the user's back, making it likely that virtually any area of his back will cause at least one opposing sets of block contacts 37a, 37b to stay closed. Another advantage is that it concentrates significant pressure-sensitive ribbon surface area at or just below the small of the user's back. For many users, their back area near the small of the back region (essentially the base of the spine) applies the most force to a pressure sensitive ribbon; but also the user's lower back region typically is the last body part to clears contact with the ribbons 31 in event of a pitch forward. This point can be appreciated by referring again to FIG. 7.

Figure 11:
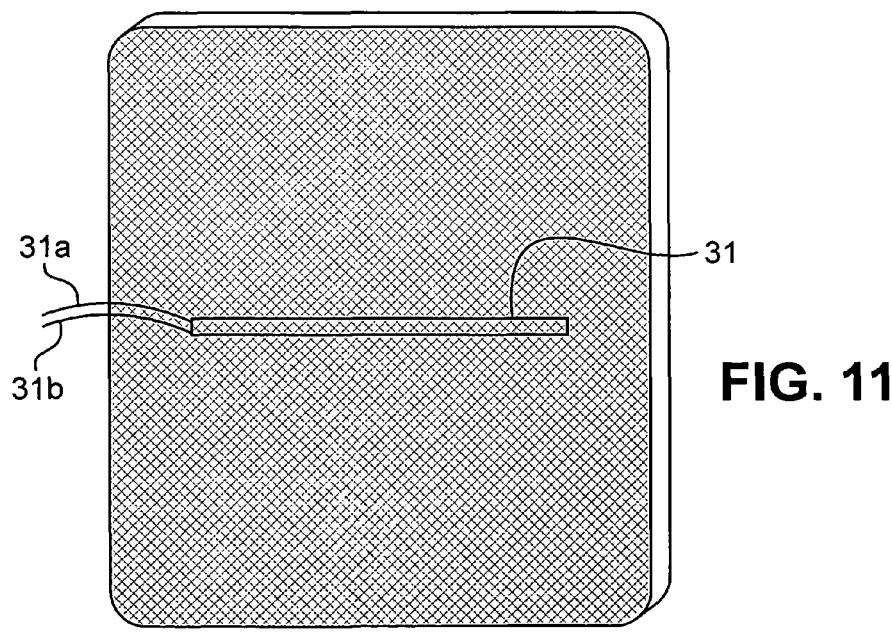
FIG. 11 is a front view of safety switches embedded in fabric.

An alternative mounting for ribbons 31 is to sew or weave, or otherwise form ribbons 31 into the fabric of the cover of cushion 7 as shown in FIG. 11.

Most wheel chairs use joysticks such as joystick 24 to control power to one or two motors 20a, 20b. The operation of a joystick with this invention is conventional. Briefly, joystick 24 has a neutral position to which the joystick positively reverts if the user relinquishes contact with the joystick 24. This built-in "bias to neutral" for all joysticks means that at least some of the time in the event of a fainting, the user will relax the hold on the joystick 24 enough to cause it to revert to neutral. In neutral, power to the motors 20a, b, is cut off and motor braking occurs. If however the user does not release the joystick 24 with fainting, then in accordance with the invention wheel chair 10 still will shut down and stop as the user pitches forward as in FIG. 7.

FIG. 10 illustrates schematically one set of cable and wire connections useful for practicing the invention. The motors 20a, 20b receive power from battery 27 in this embodiment through the power connection 38 to a solenoid 29. Solonoid 29 is normally in an "off" mode when no activation signal is sent to it from a neutral-mode joystick 24, in which case no current flows to motors 20a, 20b. Likewise, wheel chair 10 will be in an "off mode" with placing of on-off switch 41 in FIG. 1 in it's "off" position. A control circuit 43 leads from joystick 24 to motor controller 39 to provide forward, reverse and off commands to each motor 20a, 20b. When the user turns switch 41 on and operates joystick 24, and a signal path through the series-connected ribbon switch 31 is established to solenoid 29 by the user's back closing any part of switch 31, power is supplied to motors 20a, 20b. Controller 39 receives signals from joystick 24 through control leads including leads 22 shown in FIG. 1, and converts them to inputs that set motors 20a, 20b to "forward" or "reverse" modes as the user maneuvers around. When the normally "off" safety ribbon switch 31 placed in series between joystick 24 and solenoid 29 experiences enough pressure from a user's back to close any of the pressure-sensitive contact points 37a, 37b, then switch 31 is in its "closed" mode and the circuits to motors 20a, 20b are enabled. If now the user pitches forward enough to open all the contact points 37a, 37b, switch 31 goes into "open" mode which disables solenoid 29 and kills motors 20a, b.

A delay line 44 shown in FIG. 10 may be associated with solonoid 29 to delay the switching-off of solonoid 29 for a brief time of for example up to two seconds. Having delay line 44 in the circuit controlling power to motors 20a, 20b will allow a user to make a brief adjustment in position with respect to the backrest support 13 and cushion 7 even if it results in opening of all blocks 37a, 37b. The delay prevents solonoid 29 from immediately de-activating when safety switch 31 opens, which provides additional safeguard from false readings of a user pitching forward.

Figure 13:
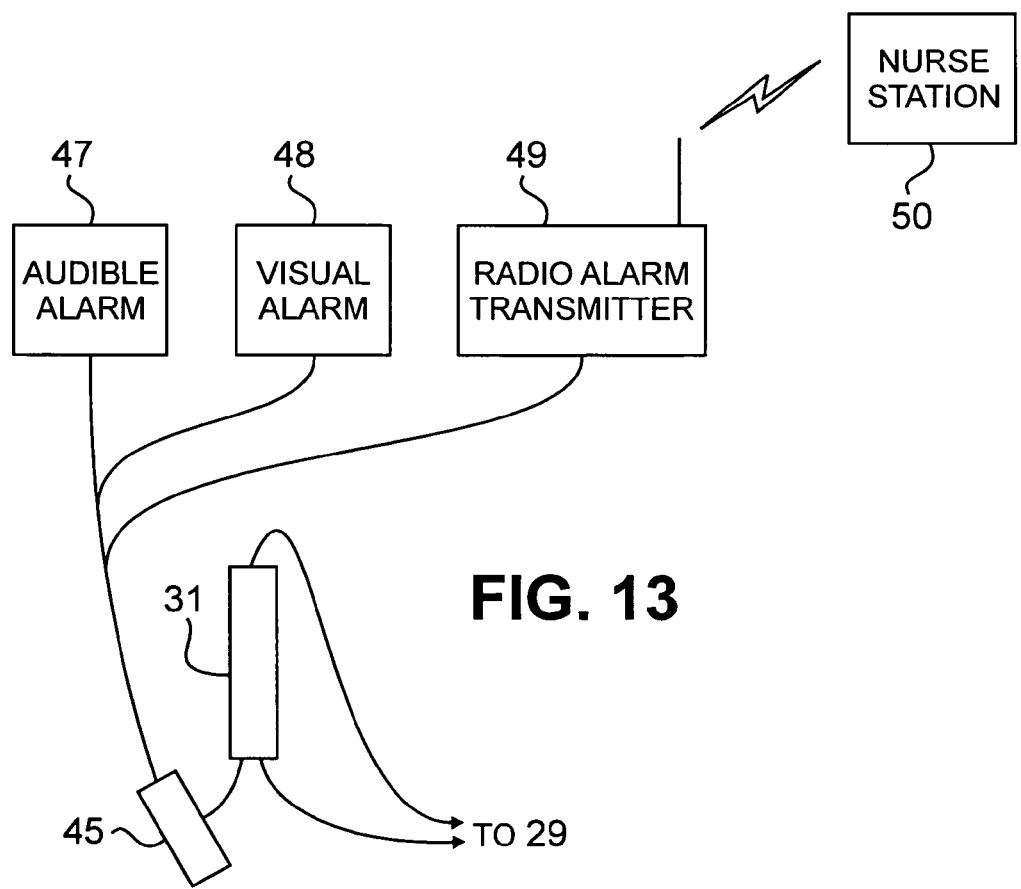
FIG. 13 is a schematic diagram of alarm means.

An optional warning alarm may be provided to immediately signal an alert to staff or passersby in the vicinity that the person in the wheel chair may need urgent help. FIG. 13 illustrates warning alarm means which activate through controller 39 immediately upon opening of switch 31. A safety switch "open" condition detector 45 connected to switch 31 detects an "open" condition that has occurred and in response provides a signal to actuate a conventional audible alarm 47 or a conventional flashing light visual alarm 48 mounted on wheel chair 10 as seen in FIG. 1. Also, a warning signal is provided by wireless radio transmitter 49 to an attendant's station 50.

The immediate warning alarms are useful to the wheel chair occupant as well, since he may have triggered an unintended "open" by repositioning of his back during normal use. With delay line 44 retarding the shutting down of motors 20a, 20b by a brief time of up to 2 seconds, the user is forewarned by the immediate alarm signals of the imminent motor shut-down and can press his back onto cushion 7 again. This again closes the safety switch 30, which re-establishes joystick control of motors 20a, 20b.

Figure 12:
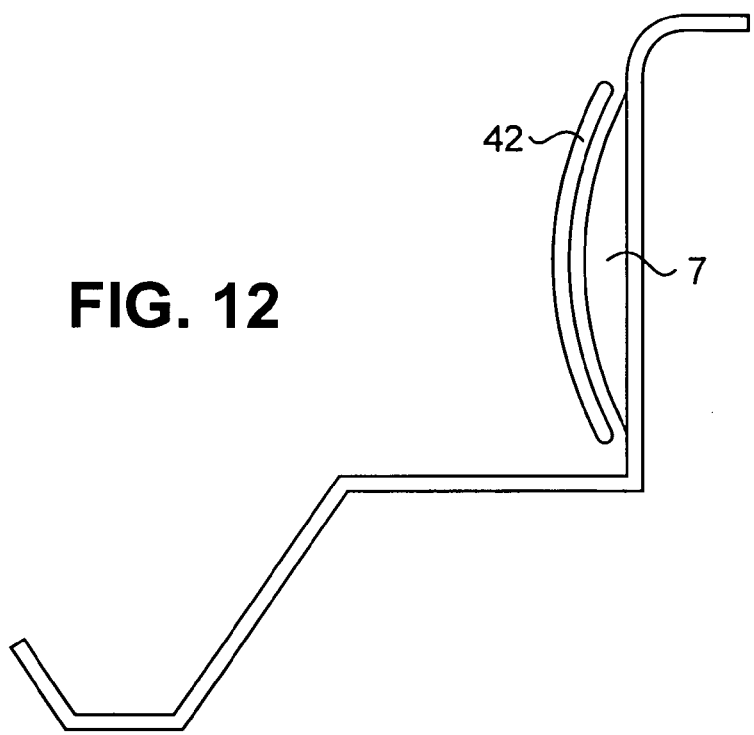
FIG. 12 is a side view sketch showing padding over cushion.

It is desirable that, whatever the ribbon number and configuration, some user adjustment be available to vary the trigger point so that ribbon switch will open faster. A problem in realizing a simple and inexpensive way to vary the trigger point for "open" mode is that the characteristics of the ribbons are fixed for a given seat back. One way to provide some adjustment is to artificially vary the body pressure applied to the backrest. This may be accomplished by interposing between the user's back and ribbon switches 31 one or more pads 42 of rubber or cloth. Such a pad arrangement is illustrated in FIG. 12. Whether the ribbon(s) are surface-mounted, or integrated into the cushion cover fabric, or are on the interior aide of the cover, the pad 42 will soften the pressure from the user's back to the ribbons, and thus reduce the sensitivity of switch 30 to "open".

Advantage can be gained if the blocks 37a, 37b are constructed with a controlled amount of electrical resistivity. Instead of a dead short existing between the opposing blocks 37a, 37b, there may be a predetermined voltage drop across them when in their closed mode. Thus, in this embodiment, there exists a full open circuit as all of the blocks 37a, 37b are in their open mode; but when in their closed position the blocks 37a, 37b will register, for example, a 5 volt voltage drop across the opposed contacts depending on the electrical resistance they offer. Depending therefore on the voltage output of battery 27 and the total resistance of the ribbon array, the resistive ribbon switches 31 will generate some amount of heat. If the ribbon array is surface-mounted as shown in FIG. 9, it is seen that the heat from ribbons 31 can be comforting and restorative to many wheel chair-bound persons especially those with chronic back conditions. The added energy drain on battery 27 due to the heat dissipation from ribbon arrays 31 does not limit the utility of the wheel chair in most environments since recharging apparatus is provided nearby in any case.

Ribbons described herein are available from many suppliers including Tapeswitch Corp. Inc. of Farmingdale N.Y.

The invention claimed is:

1. A safety system for a motorized wheel chair comprising a seat, an upright backrest having front and back surfaces, a pair of drive wheels, motor means configured to operably propel said drive wheels, a power source, a control circuit including a joystick and a main on-off power switch connected in said control circuit, said control circuit configured to electrically connect said power source to said motor means, said safety system being capable of disabling operation of said motor means of said wheel chair, said safety system comprising:

pressure-sensitive switch means mounted to said upright backrest of said wheel chair, said switch means comprising first and second internal opposing contact elements configured to contact each other when said switch means is closed in response to force from a wheel chair user's back pressing against said upright backrest and said contact elements of said switch means further configured to be out of contact with each other when said switch means is open in response to a removal of said force from said upright backrest when said wheel chair user voluntarily or involuntarily moves forwardly away from said upright backrest so as to no longer press against said upright backrest;

power switching means connected in said control circuit, said power switching means responsive to said switch means being open or closed, said power switching means being activated to allow power from said power source to be supplied to said motor means when said switch means is closed and said power switching means being deactivated when said switch means is open, thus not allowing power from said power source to be supplied to said motor means, thereby disabling operation of said motor means and further stopping said wheel chair when said wheel chair is already in a state of motion;

delaying means connected in said control circuit and in communication with said power switching means, said delaying means configured to delay immediate deactivation of said power switching means for a predetermined amount of time upon said switch means being open;

alarm means mounted on said wheel chair and configured to be noticeable by said wheel chair user, said alarm means providing immediate audio and/or visual alerts when said alarm means is activated; and condition detection means responsive to said switch means being open, said condition detection means activating said alarm means when said condition detection means detects said switch means as being open.

2. The safety system in accordance with claim 1, wherein said switch means is at least one ribbon switch comprising:

output leads connected respectively to said first and second internal opposing contact elements, said output leads being electrically connected to said control circuit; and wherein said first and second internal opposing contact elements are elongated first and second internal opposing contact strips.

3. The safety system in accordance with claim 2, wherein said at least one ribbon switch is mounted on said front surface of said upright backrest of said wheel chair.

4. The safety system in accordance with claim 3, wherein said at least one ribbon switch comprises a plurality of ribbon switches.

5. The safety system in accordance with claim 4, wherein said plurality of ribbon switches are configured as two upright parallel ribbon switches mounted on opposite left and right portions of said front surface of said upright backrest.

6. The safety system in accordance with claim 4, wherein said plurality of ribbon switches further comprises a plurality of overlapping ribbon switches concentrated at an area on said front surface of said upright backrest, the area configured to positionally correspond with a lower region of said wheel chair user's back when said wheel chair user occupies the wheel chair.

7. The safety system in accordance with claim 2, wherein each of said elongated first and second internal opposing contact strips comprises a plurality of opposing individual contact points, wherein when contact between at least one pair of said plurality of opposing individual contact points occurs, the at least one ribbon switch functions as being closed.

8. The safety system in accordance with claim 2, wherein said at least one ribbon switch is mounted so as to be embedded within said upright backrest of said wheel chair.

9. The safety system in accordance with claim 1, wherein said power switching means is a solenoid switch.

10. The safety system in accordance with claim 1, wherein said alarm means comprises one or more of:

an audible alarm;

a flashing light visual alarm; and a radio alarm transmitter in communication with and responsive to said condition detection means, wherein said radio alarm transmitter is configured to wirelessly transmit an alarm signal to an attendant station located remotely from said wheel chair.

* * * * *